(12) United States Patent
Roberts et al.

(10) Patent No.: US 6,369,119 B1
(45) Date of Patent: Apr. 9, 2002

(54) ROSIN EMULSION

(75) Inventors: John C. Roberts, Hyde; Martin Phillipson, Blackburn, both of (GB)

(73) Assignee: Rasio Chemcials UK Ltd, Lancashire (GB)

(*) Notice: Subject to any disclaimer, the term of this patent is extended or adjusted under 35 U.S.C. 154(b) by 0 days.

(21) Appl. No.: 09/544,752

(22) Filed: Apr. 7, 2000

Related U.S. Application Data (63) Continuation of application No. PCT/GB98/03006, filed on Oct. 8, 1998.

(51) Int. Cl.[7] .............................. B01F 17/18; B01F 3/12; C09D 103/10
(52) U.S. Cl. ................... 516/77; 106/208.4; 106/214.2; 106/219; 516/66; 516/67; 516/925
(58) Field of Search .............................. 516/66, 67, 77, 516/925; 106/208.4, 219, 214.2

(56) References Cited

U.S. PATENT DOCUMENTS

| | | | | |
|---|---|---|---|---|
| 2,995,513 A | * | 8/1961 | Paschall et al. | |
| 3,342,840 A | * | 9/1967 | Sobolev | 516/67 X |
| 3,467,647 A | * | 9/1969 | Benninga | 516/77 X |
| 3,582,464 A | | 6/1971 | Aldrich | 162/180 |
| 3,854,970 A | * | 12/1974 | Aitken | 106/214.2 X |
| 4,157,982 A | * | 6/1979 | Clemons et al. | 516/66 |
| 4,263,182 A | | 4/1981 | Aldrich | |
| 4,464,202 A | * | 8/1984 | Andres et al. | 106/208.4 X |
| 5,846,308 A | * | 12/1998 | Lauzon | 516/77 X |

FOREIGN PATENT DOCUMENTS

| | | |
|---|---|---|
| EP | 0056876 | 8/1982 |
| EP | 0686727 | 12/1995 |

* cited by examiner

*Primary Examiner*—Richard D. Lovering
(74) *Attorney, Agent, or Firm*—Woodard, Emhardt, Naughton Moriarty & McNett (57) ABSTRACT

A cationic rosin-in-water emulsion which has been prepared without intermediate isolation of an anionic rosin-in-water emulsion and in which the dispersed rosin phase is stabilized by a cationic polymer derived from a degraded starch, said polymer having a degree of substitution of at least 0.15 quaternary groups per glucose unit.

29 Claims, 1 Drawing Sheet

Figure 1:
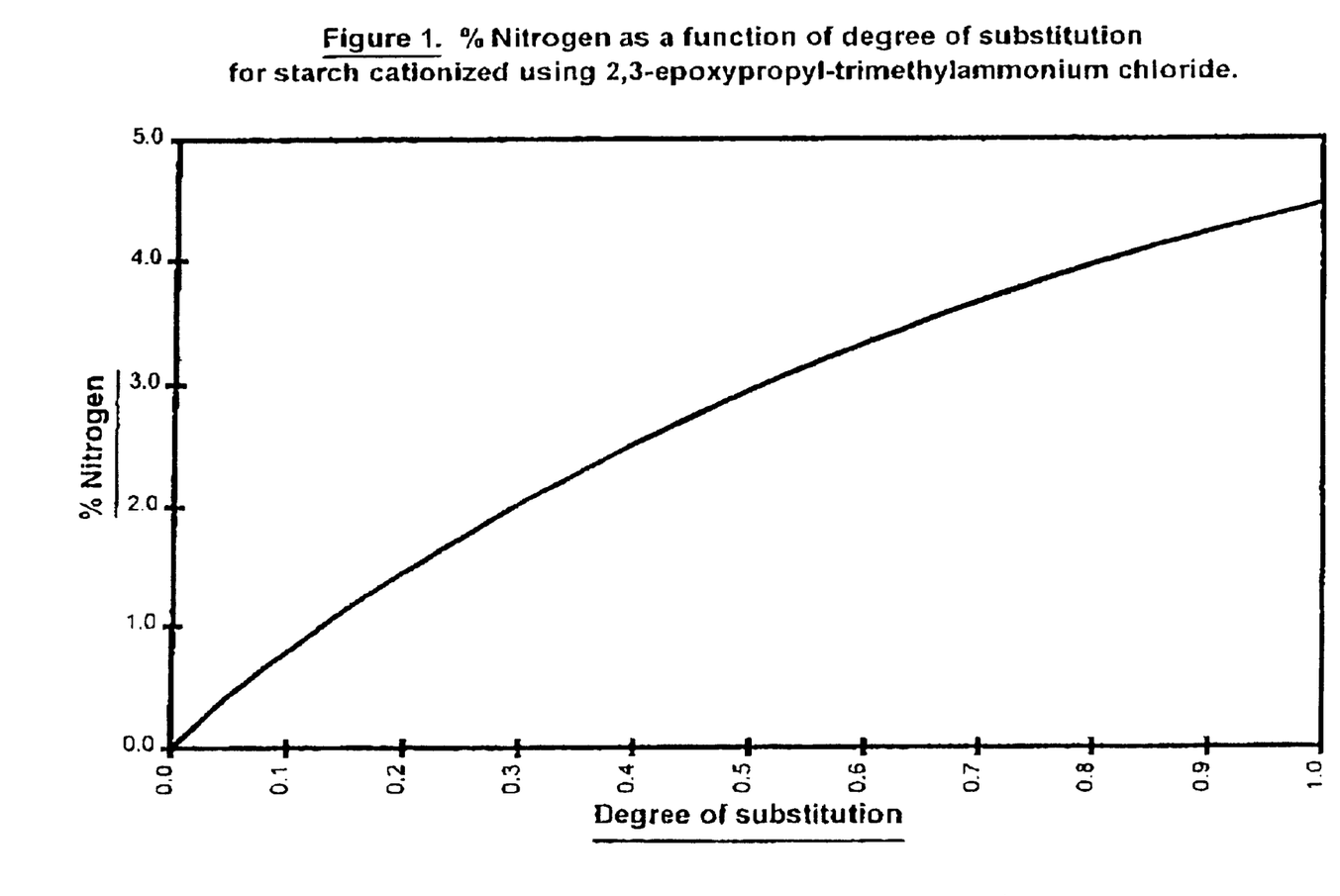

Figure 1. % Nitrogen as a function of degree of substitution for starch cationized using 2,3-epoxypropyl-trimethylammonium chloride.

ROSIN EMULSION

This application is a continuation of international application number PCT GB/98/03006, filed Oct. 8, 1998.

The present invention relates to rosin emulsions for use in the sizing of paper, board and like materials and also relates to a method of sizing using the rosin emulsion.

It is well established practice to effect paper sizing by use of a rosin emulsion and a soluble aluminium salt such as aluminium sulphate (e.g. in the form of paper-makers alum [$Al_2(SO_4)_3.16-18H_2O$], aluminium chloride, polyaluminium chloride or aluminium chlorohydrate. (Although the term "emulsion" is conventionally used to describe the rosin product it should more properly be called a dispersion since although made as an emulsion, the particles are effectively solid at ambient temperature). The rosin emulsion and aluminium salt are generally used as separate additions to the paper making process although it is also known to formulate so-called "one-shot" compositions which are formed by pre-mixing a rosin emulsion and an aluminium salt.

One method of producing a rosin emulsion is by the well established Bewoid process as disclosed in U.K. Patent No. 335 902. In this process, sizes with about 90% free rosin are produced using a protective colloid (casein) as the stabilizer and a small amount of rosin soap as the dispersant. In this process, approx. 1–2% of sodium hydroxide or potassium hydroxide on the weight of rosin is used to form a rosin soap dispersant by adding it to the molten rosin (usually at a temperature of about 130° C.) so as partially to saponify the rosin, followed by the casein dissolved in approx. 10% of its weight of sodium hydroxide (although potassium hydroxide or borax are occasionally used instead). Finally, water at ambient temperature is added to produce a dispersion at a much lower temperature, usually containing between 30 and 50% solids. During the cooling back process, emulsion inversion occurs in that the initially formed water-in-rosin emulsion inverts as more water is added to give a rosin-in-water emulsion. As the temperature of the emulsion falls, the rosin emulsion droplets solidify to give a dispersion of rosin in an aqueous medium (i.e, the so-called rosin emulsion).

The rosin emulsion so formed is anionic by virtue of the presence of the anionic dispersant (rosin soap) and the casein stabilizer. Such anionic dispersions are conventional and are extensively used for sizing paper, board and like materials.

There are also disclosures in which casein has been replaced by anionic surfactants. Thus, U.S. Pat. No. 4,199,369 describes the use of a specific dispersant that is of the type alkylethyleneoxide sulphites without the use of an additional stabiliser in an inversion process leading to the production of an anionic emulsion.

Cationic sizing emulsions are also known and are preferred for various applications in that they are considered to provide improved sizing efficiency as compared to anionic dispersions. Generally, commercial cationic rosin emulsions are produced by homogenization of rosin at high temperature and high pressure (usually approx. 160° C. and 15 bar respectively) using a dispersant and a polymeric cationic stabilizer. Instead of lowering the viscosity by raising the temperature to greater than 160° C., an alternative is to dissolve the rosin in a solvent (e.g. dichloromethane—see EP 0 719 892 and EP 0 719 893) to give a solution of low viscosity which can then be homogenized at a temperature below 100° C. The stabilizer is usually a synthetic cationic polymer or it can be a cationic starch. In this respect, it should be noted that attempts to prepare cationic rosin emulsions by a "Bewoid-type" inversion process but using a cationic stabilizer instead of the anionic casein have generally been unsuccessful although U.S. Pat. No. 4,983,257 discloses an inversion process for producing a rosin emulsion by an inversion process in which pan of the casein is replaced by a cationic starch.

A development relating to cationic emulsions is disclosed in WO-A-9824972 (Roe Lee Paper Chemicals Co. Ltd.) in which a "one-shot" sizing composition is produced from an admixture of an anionic rosin emulsion, a soluble aluminium salt and a cationic starch derivative which has been produced by a process in which the starch structure was split prior to the cationizing step (e.g. as available under the trade mark RAIFIX). The requirement for the initial production of an anionic emulsion is clearly a disadvantage in that it increases the number of steps required to produce the cationic emulsion. There is also the disadvantage of the need to store the anionic emulsion before conversion to the cationic product. Because casein and a cationic stabilizer are used, the total raw material cost can be greater than producing a cationic rosin emulsion by direct homogenization of rosin, a dispersant and a cationic stabilizer.

It is therefore an object of the present invention to obviate or mitigate the abovementioned disadvantages.

According to a first aspect of the present invention there is provided a cationic rosin-in-water emulsion which has been prepared without intermediate isolation of an anionic rosin-in-water emulsion and in which the dispersed rosin phase is stabilised by a cationic polymer derived from a degraded starch, said polymer having a degree of substitution of at least 0.15 quatemary groups per glucose unit.

According to a second aspect of the present invention there is provided a method of producing a cationic rosin-in-water emulsion comprising effecting emulsification of rosin in water in the presence of a cationic polymer derived from a degraded starch, said polymer having a degree of substitution of at least 0.15 quatemary groups per glucose unit.

The invention has been based on our discovery that cationic polymers derived from degraded starch (as defined in the previous paragraph) may be used for directly producing cationic rosin size emulsions from rosin without the need for preliminary isolation of an anionic rosin emulsion, avoiding the disadvantages of the prior art as discussed above.

The rosin emulsion of the invention may be produced in various ways which are described more fully below. Briefly, however, the emulsions may be prepared by an inversion process in which an emulsion of water in molten rosin is "inverted" in the presence of the cationic polymer derived from degraded starch to produce a rosin-in-water emulsion. A further possibility is for the rosin emulsion to be produced by homogenization of a rosin and the cationic polymer.

The important feature of the invention is the use of a cationic polymer derived from a degraded starch and having a degree of substitution of at least 0.15 quaternary nitrogen groups per glucose unit. Such polymers may be produced, from starch, by splitting the starch structure and then effecting cationization producing a polymer which has a very high level of cationicity. Such starch derivatives may be produced with a range of relative molar masses and degree of cationization.

Preferably the cationic polymer used in the present invention has 0.15 to 1.30 quatemary groups per glucose unit. More preferably, this degree of substitution is from 0.20 to 1.10, even more preferably from 0.20 to 0.80 and most preferably from 0.50 to 0.80 quaternary groups per glucose unit.

The degree of substitution (i.e. at least 0.15 quaternary groups per glucose unit) in the cationic polymers employed in the present invention is considerably higher than that found in the cationic starches conventionally used for producing cationic emulsions for use in paper sizing. Thus, the cationic polymers have a higher charge density than the conventional starches. For example, conventional cationic starches are generally considered to have a charge density expressed in milli-equivalents per gramme (i.e. the average number of milli-equivalents of quaternised nitrogen per gramme of the polymer) in the range of 0.1–0.3. Typically the cationic polymers employed in the present invention have a charged density of 1.0 to 3.5 milli-equivalents per gramme. Whilst we do not wish to be bound by theory, we believe that the success of the present invention is due to this higher charge density and lower relative molar mass.

The starch derivatives used in the present invention may be produced by treating starch with an agent which will partially "fragment" the polysaccharide chain (e.g. by use of an oxidising agent such as hydrogen peroxide) and subsequently quaternising the "fragmented" product in a reaction in which the solids content is a minimum of 50% (more preferably at least 55%) by weight. The cationizing agent may be used in an amount of 20 to 160%, most preferably 80 to 120%, by weight of the amount of starch thereby allowing the degree of cationization to be readily controlled.

The preferred cationizing chemical is 2,3-epoxypropyl trimethyl ammonium chloride although other cationizing agents may be used.

Preferred starch derivatives for use in the invention have a nitrogen content in the range of approximately 1–5% (for the cationizing chemical being 2,3-epoxypropylene trimethyl ammonium chloride). It is particularly preferred that cationic, oxidised starch derivatives for use in the invention have a nitrogen content of 3–5%, more preferably 3–4%, and ideally about 3.5% (for the cationizing chemical being 2,3-epoxypropylene trimethyl ammonium chloride).

The relationship between the nitrogen content of the cationic polymer (quaternised using 2,3-epoxypropyl trimethyl ammonium chloride) and degree of substitution per glucose unit is illustrated in FIG. 1 of the accompanying drawings. It can be seen from the graph of FIG. 1 that the polymers mentioned above containing 3–4% of nitrogen have a degree of substitution in the range of about 0.53 to about 0.8.

It is preferred that the starch derivative for use in the invention has a molecular weight in the range of 100,000 to 500,000 Daltons, more preferably 150,000 to 450,000.

Further details as to the manner in which the starch derivatives may be manufactured are given in WO-A-95/18157 and Finnish Patents Nos. 94135 and 94128 (all in the name of Raisio Chemicals). The disclosures of these prior specifications are hereby incorporated by reference.

Particularly suitable quaternised, oxidised starch derivatives for use in formulating the emulsions of the invention are available under the trade mark RAIFIX which designates a range of products of varying cationicity and molecular weight. RAIFIX products are available under the following five figure product codes:

| Raifix 01035 | Raifix 07035 | Raifix 15035 | Raifix 25035 |
| Raifix 01025 | Raifix 07025 | Raifix 15025 | Raifix 25025 |
| Raifix 01015 | Raifix 07015 | Raifix 15015 | Raifix 25015 |

In these product codes, the first three figures are representative of molecular weight (the higher the number the higher the percentage molecular weight) and the final two figures being approximately ten times the nitrogen content. Estimates of the relative molar mass of the RAIFIX products are 100,000 Daltons for the 010xx designations and 500,000 Daltons for the 250xx designations. Preferred RAIFIX products for use in the invention have a molecular weight designation of at least 070 and a nitrogen designation of at least 35. Particularly suitable RAIFIX products for use in the invention are available under the designation 07035 and 15035.

The rosin used in the emulsion of the invention may be for example be a wood rosin, gum rosin, tall oil rosin or mixtures thereof. The rosin may be maleated, fortified, unfortified, hydrogenated or disproportionated. The rosin may optionally be esterified. If a tall oil rosin is used then it is preferred that it be pre-treated with paraformaldehyde.

The preferred rosin for use in the invention is a maleated or fumarated rosin.

If desired, the rosin may be compounded with tall oil fatty acids as proposed in UK-A-2 268 941. Tall oil fatty acids are available for example under the designation CENTURY MO6 (ex Union Camp Chemicals Limited). Any other rosin diluent (e.g. a hydrocarbon resin) may alternatively be used.

Rosin emulsions in accordance with the invention may, for example, typically have a solids content of 60% by weight or less, e.g. 55% by weight or less. In more preferred embodiments of the invention, the rosin emulsion will have a maximum solids content of 50% by weight, more preferably a maximum of 40% by weight and even more preferably a maximum of 30% by weight. The rosin (together with all tall oil fatty acids present) may comprise 75% to 95% by weight of the total solids of the rosin emulsion and the cationic starch derivative may correspondingly comprise 5% to 25% of the total solids. In a particularly suitable rosin emulsion in accordance with the invention, the rosin (including any tall oil fatty acids) provide about 87 to 93% by weight of the total solids.

As indicated briefly above, a rosin emulsion in accordance with the invention may be produced by an inversion process in which, in a manner akin to the Bewoid process (but using the cationic starch derivative as stabilizer instead of casein) an emulsion of water in molten rosin is inverted to produce a rosin-in-water emulsion.

A particularly preferred method of producing an emulsion in accordance with the invention by an inversion process comprises the steps of 1. Melting the rosin and stirring the molten material (e.g. in a standard Bewoid pot).
2. Either saponifying some of the rosin or treating the rosin with a dispersant, e.g, naphthalene sulphonic acid—formaldehyde condensate or sodium lignosulphonate, or a dispersant as disclosed in U.S. Pat. No. 4,199,369.
3. Cool back the rosin with water, heated somewhat if necessary, until the temperature is just below 100° C.
4. Adding a solution of the cationic starch derivative, preferably at an elevated temperature, to the stirred molten rosin.
5. Continuing to stir the mixture of rosin and cationic starch derivative for at least several minutes which serves to mix thoroughly the starch solution with the rosin, and the experiments we have performed has helped in the control of the particle size of the final emulsion.
6. Adding dilution water (sometimes it is of assistance to use heated water at 80–95° C. whilst stirring until approximately 50% solids is attained. During this process the emulsion inverts to a rosin-in-water emulsion.
7. Adding further quantities of water to produce an emulsion of the required solids content.

In step 4 of the above process, the solution of the cationic starch derivative is preferably heated to a temperature of at least 85° C. and more preferably to a temperature close to that of the cooled back rosin prior to addition to the molten rosin. In step 5, the water is preferably but not necessarily heated to a temperature of at least 80° C. more preferably at least 90° C. before addition to the molten rosin. Without use of the elevated temperature additions in step 4 and 5, it may be found that the these additions can quickly cause undesirable thickening (and possibly solidification) of the rosin.

Furthermore, it may be found that (at least for certain rosins) the viscosity of the emulsion at all stages is higher than during preparation of standard anionic emulsions. This can cause inefficient mixing and beating resulting in a poor particle size. The problem may however be readily overcome by substituting up to 20% by weight, ideally about 5 to 10% by weight, of the rosin with tall oil fatty acids. (e.g. as available under the designation CENTURY MO6). Alternatively or additionally, the speed of mixing may be increased as compared to production of a conventional anionic rosin emulsion.

An alternative method of producing the emulsion is in add molten rosin, with vigorous stirring to heated water (e.g. 85–95° C.) containing a saponifying, agent (e.g. NaOH) or a dispersant for the rosin. Subsequently the starch derivative is added followed by dilution water. Provided that the volume ratio of rosin to total aqueous phase (prior to addition of dilution water) is greater than about 60:40 and that by addition of dilution water this ratio is reduced to below 40:60 then such a production method usually involves conversion of a water-in-rosin emulsion to a rosin-in-water emulsion.

A further alternative method of producing emulsions in accordance with the invention is by homogenization of molten rosin and a solution of the cationic starch derivative using conventional homogenization equipment. If it is desired to effect homogenization at a temperature of less than 100° C. then it is preferred that up to 20% by weight, ideally about 5 to 10% by weight, of the rosin is substituted by tall oil fatty acids. A more commercial method would be to omit the tall oil fatty acids from the formulation, and opt for higher temperatures where the viscosity of the rosin is low enough to permit direct homogenisation of the rosin. This approach would suggest temperatures of the order of 160° C. and pressures greater than the vapour pressure of water at this temperature.

An alternative to effecting homogenization of molten rosin is for the rosin to be dissolved in a suitable solvent, e.g. dichloromethane, and the solution homogenised with water and the cationic starch derivative prior to solvent removal.

Rosin emulsions in accordance with the invention may be used for the internal or surface sizing of paper, paper board and like materials using well established techniques. Thus, for example, sizing may be effected by use of the rosin emulsion and a soluble aluminium salt such as aluminium sulphate, e.g. in the form of paper-makers alum $[Al_2(SO_4)_3.16–18H_2O]$, aluminium chloride, polyaluminium chloride or aluminium chlorohydrate. The amount of rosin emulsion used will typically be such that the amount of rosin is 0.2–3% by weight dry basis on the weight of fibres.

The rosin emulsion and aluminium salt may be added as separate additions to the wet end of the paper making process. The rosin emulsion and aluminium salt may, for example, be added using the techniques disclosed in WO-A-91/02119. It is however also possible to formulate a "one-shot" composition, i.e. a formulation in which the rosin emulsion and the aluminium salt are mixed together before being supplied in a single container. "One-shot" products made from conventional anionic Bewoid emulsions require that agitation is continued beyond formulation of an initial precipitate to convert the latter into an emulsion (see for example GB-A-2 050 453) which discloses production of "one-shot" emulsions from an anionic Bewoid rosin emulsion and an aluminium salt.

The invention is further described in the following non-limiting Examples.

EXAMPLES

Example 1

An emulsion was prepared using the apparatus and procedure described below from the following components:

| | |
|---|---|
| Maleated gum rosin | 504 g |
| Century MO6 | 56 g |
| Raifix 07035 @ 20% solids | 230 g |
| NaOH (47%) | 8.5 g |
| Water to adjust the solids to 30% | |

The maleated rosin corresponded to 7% treatment with maleic anhydride. The amount of Century MO6 (tall oil fatty acids) corresponded to 10% by weight of the total weight of rosin and Century MO6.

Using the procedure described below, the rosin was produced in an apparatus which was essentially a scaled down laboratory version of that described in the original Bewoid patent, the scaled down version having a capacity of 1.4 $dm^3$. The lower stirrer blade had a diameter of 7.3 cm and the upper blade (which was spaced from the lower blade by 4.0 cm) had a diameter of 8.5 cm and was at right angles to the upper blade. The speed of the stirrer blades was controlled by means of a geared stirrer motor controller. The pot was heated by an electric element associated with a temperature controller and a thermocouple sensor.

To produce the emulsion, the heated (maleated) gum rosin was poured into the pot and maintained with stirring at a temperature of about 130° C. The heat was then turned off and the NaOH (47% solution) was slowly added followed by a small quantity of water until the temperature of the mass was about 85–95° C. The RAIFIX solution was heated to 95° C. and then slowly poured onto the rosin. Stirring of the resultant water-in-rosin emulsion was continued for 7 minutes. Dilution water was then added (sometimes it is of assistance to use heated water at 80–95°) whilst stirring until approximately 50% solids was attained. During this process, the emulsion inverted to give a rosin-in-water emulsion. Finally, further water was added to reduce the total solids content to about 30%. The rosin emulsion droplets solidified as the temperature was further reduced.

The resultant rosin emulsion had a viscosity of 59 mPa s and a mean volume % particle size of 0.45 μm.

Stability of the dispersion against sedimentation was tested by placing a 10 ml sample of the emulsion in a 10 ml centrifuge tube (TPX, transparent conical, graduated in 0.1 ml divisions) and spinning the tube in a MSE Mistral 1000 centrifuge which had been pre-programmed to spin for 15 min at 3,000 rpm, When the centrifuge had finished its spinning period and slowed down until stationary, the centrifuge tube containing the rosin emulsion sample was removed and the free emulsion on top of the sediment decanted out of the tube to leave the sediment at the bottom of the tube. The sedimentation tube was then rinsed carefully so as not to disturb the sediment, the level of which was then read from the calibrated scale. The volume of the sediment was noted and expressed as a percentage of the original volume of rosin emulsion to provide a "% accelerated sedimentation" value as determined by the equation:

$$\% \text{ accelerated sedimentation} = \frac{\text{volume of sediment} / \text{ml}}{10 / \text{ml}} \times 100.$$

This value has been found to enable an estimate of how the emulsion will behave over a period of 90 days.

The accelerated sedimentation value of the emulsion was determined to be 0.6.

Example 2

Using the apparatus and procedures described in Example 1, a rosin emulsion was prepared from the following components:

| | |
|---|---|
| Maleated gum rosin | 504 g |
| Century MO6 | 56 g |
| Raifix 15035 @ 20% solids | 180 g |
| NaOH (47%) | 8.5 g |
| Water to adjust the solids to 30% | |

The maleated rosin corresponded to 7% treatment with maleic anhydride.

The properties of the resultant emulsion were as follows:

| | |
|---|---|
| Accelerated sedimentation | 1.0% |
| Mean Volume % particle size | 0.86 μm |

Example 3

Using the method and apparatus described in Example 1, a rosin emulsion was prepared from the following components:

| | |
|---|---|
| Maleated gum rosin | 532 g |
| Century MO6 | 28 g |
| Raifix 15035 @ 20% solids | 180 g |
| NaOH (47%) | 8.5 g |
| Water to adjust the solids to 30% | |

The maleated rosin corresponded to 7% treatment with maleic anhydride. The amount of Century MO6 (tall oil fatty acids) corresponded to 5% by weight of the total weight of rosin and Century MO6.

The properties of the resultant emulsion were as follows:

| | |
|---|---|
| Accelerated sedimentation | 1.2% |
| Mean Volume % particle size | 1.03 μm |

Example 4

A full scale Bewoid pot (2.2 tonne capacity) was used in conjunction with the method described in Example 1 to produce a rosin emulsion from the following components:

| | |
|---|---|
| Maleated gum rosin | 532 kg |
| Century MO6 | 28 kg |
| Raifix 07035 | 300 kg |
| (133 kg @ 30% solids premixed with 167 kg H$_2$O) | |
| NaOH (47%) | 8.5 kg |
| Water to adjust the solids to 30% | |

The maleated rosin corresponded to 7% treatment with maleic anhydride in all of the examples. The amount of Century MO6 represented 5% by weight of the total weight of maleated gum rosin and Century MO6.

The resultant emulsion had the following properties:

| | |
|---|---|
| Accelerated sediment | 4.0% |
| Mean Volume % particle size | 1.65 μm |

Example 5

A "one-shot" product was prepared by mixing equal volumes of the emulsion obtained in Example 1 and papermakers' alum (a 47% solution of $Al_2(SO_4)_3.16-18H_2O$ in water).

Example 6

The emulsion of Example 4 was compared for sizing efficiency with a conventional anionic Bewoid emulsion (RE-3) made in that manner with casein as described in the original Bewoid patent but with the rosin containing 5% substitution with Century MO6.

The comparison of sizing efficiency was based on hand sheet work. The machine used was a 20 cm×20 cm (8"×8") square Formex sheet former fitted with a means of recycling the backwater and a means of heating the furnish. Handsheets were made in a sequence of 10 sheets using recycled backwater from the previous sheet. The wet handsheets are pressed in a rotary press and dried in rotary drier. It has previously been established that sheets 8, 9 and 10 give results that are close to those obtained on a full scale paper machine with a similar furnish.

The furnish used in this Example was a total waste furnish produced in a commercial mill for the manufacture of liner board and containing 250 g tonne$^{-1}$ of a retention aid (Percol 63). The furnish was chosen as being one which is difficult to size.

In the sizing tests, the rosin emulsions were used in an amount of 0.3% dsf rosin equivalent weight. The abbreviation "dsf" stands for "dry solids on fibre". This is a way in which the paper making industry expresses addition from what may be varying concentration dispersions, emulsions or solutions. Thus "% dsf" means the % weight of the dry material specified on weight of dry fibre. The term "rosin equivalent weight" means the combined weight of maleated gum rosin and Century MO6.

The results are shown in Table 1.

TABLE 1

Comparison of the performance of RE-3 with cationic emulsion of Example 3

Rosin emulsion: RE-3 @ 1.0% dsf rosin equivalent wt
Furnish: Waste liner board furnish from commercial paper mill
Retention aid addition: 250 g tonne$^{-1}$ of Percol 63

| Sheet No. | Sheet Wt/g | Cobb Test/g m$^{-2}$ |
|---|---|---|
| 1 | 2.34 | — |
| 4 | 2.57 | — |
| 7 | 2.45 | 34.5 |
| 10 | 2.59 | 33.6 |

Resin emulsion: Emulsion of Example 3 @ 1.0% dsf rosin equivalent wt
Furnish: Waste liner board furnish from commercial paper mill
Retention aid addition: 250 g tonne$^{-1}$ of Percol 63

| Sheet No. | Sheet Wt | Cobb Test/g m$^{-2}$ |
|---|---|---|
| 1 | 2.31 | 57.8 |
| 4 | 2.51 | 21.1 |

TABLE 1-continued

Comparison of the performance of RE-3
with cationic emulsion of Example 3

| | | |
|---|---|---|
| 7 | 2.46 | 20.0 |
| 10 | 2.54 | 19.2 |

Rosin emulsion: Emulsion of Example 3 @ 0.9% dsf rosin equivalent wt
Furnish: Waste liner board furnish from commercial paper mill
Retention aid addition: 250 g tonne$^{-1}$ of Percol 63

| Sheet No | Sheet Wt/g | Cobb Test/g m$^{-2}$ |
|---|---|---|
| 1 | — | — |
| 4 | 2.87 | 22.0 |
| 7 | 2.89 | 20.8 |
| 9 | 2.76 | 22.6 |
| 10 | 2.80 | 25.6 |

As can be seen from the first section of Table 1, RE-3 gave only a moderate degree of sizing at 1% dsf addition, the equilibrium Cobb test values being in the mid 30s g m$^{-2}$. At the same addition rate, the emulsion of Example 3 clearly outperformed RE3, giving an equilibrium Cobb test value some 10 points lower. Both emulsions contain the same amount of Century MO6 and therefore this result must be due to the cationic formulation itself.

When the addition rate of the emulsion of Example 3 was decreased to 0.9% dsf, there was a closer correlation with the results obtained using RE-3 at 1% dsf. This indicates that there is an improvement in performance in these experiments approaching 10% for the emulsion of Example 3 (compared to RE-3).

Example 7

Using the handsheet procedure described in Example 6, the sizing efficiency of the emulsion obtained in Example 2 (10% Century MO6 substitution for rosin) was compared with that of RE-3 (5% Century MO6 substitution).

The furnish used comprised 70% hardwood and 30% softwood and contained as retention aid (Percol 63) in an amount of 300 g tonne$^{-1}$.

The emulsion of Example 2 and RE-3 were both used as 0.3% dsf rosin equivalent weight.

The results are shown in Table 2.

TABLE 2

Comparison of the performance of RE-3
with cationic emulsion of Example 2
Furnish: 70% hardwood, 30% softwood
Retention aid addition: 300 g tonne$^{-1}$ of Percol 63

| Sheet No. | Sheet Wt/g | Cobb Test/g m$^{-2}$ |
|---|---|---|
| Rosin emulsion: RE-3 @ 0.3% dsf rosin equivalent wt | | |
| 1 | 2.64 | 65.4 |
| 4 | 2.72 | 74.3 |
| 7 | 2.56 | 23.7 |
| 10 | 2.36 | 22.3 |
| Rosin emulsion: Emulsion of Example 2 @ 0.3% dsf rosin equivalent wt | | |
| 1 | 2.13 | 49.7 |
| 4 | 2.51 | 31.6 |
| 7 | 2.60 | 29.0 |
| 10 | 2.56 | 25.7 |

Table 2 illustrates comparable performance between RE-3 and the emulsion of Example 2. Thus the near compatibility in performance would seem to indicate an improved performance for a cationic rosin made with Raifix as compared to an anionic one made with casein, since emulsion 2 contained 10% Century MO6 substitution for rosin, which is 5% more than that in RE-3. It is known from other work that tall oil fatty acids slightly downgrade the performance of rosin emulsions.

Example 8

Using the handsheet procedure described in Example 6, the sizing efficiency of the "one-shot" product produced in Example 5 was compared with RE-3 emulsion and papermakers' alum used in the conventional way at a weight ratio of (dry alum):(dry rosin equivalent) of approximately 3:1. The comparison was effected using a furnish comprising 70% hardwood and 30% softwood, the furnish also containing Percol 63 as a retention aid in an amount of 300 g tonne$^{-1}$.

The results are shown in Table 3.

TABLE 3

Comparison of the performance of RE-3 with the "One-Shot"
Emulsion of Example 5
Furnish: 70% hardwood, 30% softwood
Retention aid addition: 300 g tonne$^{-1}$ of Percol 63

| Sheet No. | Sheet Wt/g | Cobb Test/g m$^{-2}$ |
|---|---|---|
| Rosin emulsion: RE-3 @ 0.3% dsf rosin equivalent wt | | |
| 1 | 2.52 | 79.0 |
| 4 | 2.38 | 26.9 |
| 7 | 2.32 | 26.0 |
| 10 | 2.07 | 22.9 |
| "One-Shot" Emulsion of Example 5 @ 0.3% dsf rosin equivalent wt | | |
| 1 | 2.13 | 42.8 |
| 4 | 2.51 | 28.7 |
| 7 | 2.60 | 37.2 |
| 10 | 2.56 | 35.0 |

These results suggest that the performance of the "one-shot" emulsion close to of RE-3 but did not quite match it, probably due to the lower amount of papermakers' alum and 5% more Century MO6 substitution in the "one-shot" formulation.

Example 9

Using the handsheet procedure described in Example 6, the sizing efficiency of the emulsion obtained in Example 4 was compared with that of RE-3 both with and without retention aid.

In all cases, the furnish comprised 100% softwood kraft and sizing was effected using the rosin emulsion (RE-3 or product of Example 4) in an amount of 0.45% dsf rosin equivalent weight and papermakers' alum in an amount of 2% dsf. Sizing was effected at a temperature of 65° C. For those experiments where it was used, the retention aid was Percol 63 used in an amount of 100 g tonne$^{-1}$.

The results are shown in Table 4 (no retention aid addition) and Table 5 (retention aid addition).

TABLE 4

Comparison of the performance of RE-3 with
product of Example 4 (no retention aid)
Papermakers' alum: 2% dsf Temperature: 65° C.
Furnish: 100% softwood kraft
Retention aid addition: nil

| Sheet No. | Sheet Wt/g | Cobb Test/g m$^{-2}$ |
|---|---|---|
| Rosin emulsion: RE-3 @ 0.45% dsf rosin equivalent wt. | | |
| 1 | 2.16 | 34.7 |
| 4 | 2.10 | 33.2 |
| 7 | 2.20 | 30.7 |
| 10 | 2.24 | 29.1 |
| Rosin emulsion: product of Example 4 @ 0.45% dsf rosin equivalent wt. | | |
| 1 | 2.06 | 30.7 |
| 4 | 2.10 | 31.8 |
| 7 | 2.20 | 27.7 |
| 10 | 2.74 | 25.4 |

TABLE 5

Comparison of the performance of RE-3 with
product of Example 4 (with retention aid)
Papermakers' alum: 2% dsf Temperature: 65° C.
Furnish: 100% softwood kraft
Retention aid addition: 100 g tonne$^{-1}$ of Percol 63

| Sheet No. | Sheet Wt/g | Cobb Test/g m$^{-2}$ |
|---|---|---|
| Rosin emulsion: RE.3 @ 0.45% dsf rosin equivalent wt. | | |
| 1 | 2.17 | 34.9 |
| 4 | 2.47 | 29.8 |
| 7 | 2.68 | 29.3 |
| 9 | 2.74 | 24.9 |
| 10 | 2.28 | 29.3 |
| Product of Example 4 @ 0.45% dsf rosin equivalent wt. | | |
| 1 | 2.59 | 27.8 |
| 4 | 2.57 | 27.5 |
| 7 | 2.58 | 27.1 |
| 10 | 2.62 | 26.4 |

It can be seen from the results in Table 4, that the product of Example 4 outperformed the anionic emulsion RE-3 quite easily without a retention aid being present. With the use of a retention aid (Table 5), the cationic emulsion of Example 4 still had superior performance although the difference was not quite so marked.

Example 10

This illustrates the formation of a cationic rosin emulsion using Raifix as the stabilizer by the homogenizer method. Homogenization is applied to a solution of the rosin in an organic solvent, dichloromethane. As stated earlier, to reduce the viscosity of rosin to something less than 10 Pa s to permit satisfactory homogenization requires the use of either (i) temperatures greater than 160° C. or (ii) the addition of another component to the rosin to decrease its viscosity sufficiently at temperatures less than 100° C. U.S. Pat. No. 3,865,769 discloses the use of benzene for this purpose, and U.S. Pat. No. 4,263,182 makes use of dichloromethane. The materials used in this example were:

| | |
|---|---|
| Gum Rosin (7% maleated) | 280 g |
| Methylene chloride (dichloromethane) | 187 g |
| Raifix 15035 (20% solids) | 100 g |
| Water | 600 g |
| Further added water after homogenization to adjust the solids content of the emulsion to approximately 30%. | |

The gum rosin was dissolved in methylene chloride at ambient temperature to give a solution. The Raifix and water were added to the methylene chloride solution also at ambient temperature. The two phase system was then mixed using a high sheer (Silverson) mixer for 2 minutes, when an emulsion of moderate particle size was produced. This was then homogenized in a piston type laboratory homogenizer for 2 cycles at 3000 psi. The resulting emulsion was heated to 90° C. on a hotplate until methylene chloride solvent was completely driven off (approx. 15 min). The resulting emulsion was cooled quickly to 25° C., and then the particle size and accelerated sedimentation measured.

The final emulsion had a solids content of 28.04%, with a mean volume diameter particle size of 0.531 μm, and an accelerated sedimentation value of 0.5%. This represents an emulsion of excellent particle size for paper sizing purposes with good stability.

Example 11

100 g of water and 15 g NaOH were placed in a heated beaker provided with a high speed stirrer and a thermometer. The contents of the beaker were heated to 90° C. A rosin mixture (500 g) prepared from 20% tall oil rosin and 73% gum rosin, fortified with 7% maleic acid was heated to 150° C. and poured into the NaOH solution in the beaker with strong agitation capable of producing an emulsion.

Then 156 g of Raifix 07535, pre-heated to 90° C. on a water bath, was added and the stirring maintained. The mixture was emulsified for 15 min. and any lost water during this process was replaced at intervals. The resulting emulsion was slowly diluted to the required solids content (45%)

The emulsion had a particle size range of 0.5–1.5 μm with occasional particles of 2–4 μm. The pH of the emulsion was approximately 6.2, and there was no sedimentation during a period of 4 weeks.

It is believed that the emulsion is formed by a phase inversion method for the following reasons, Rosin has a density of approximately 1.1 g cm–3, and thus is heavy enough to sediment, but not very different in terms of specific volume to that of water. It is known that the inversion process normally occurs when the volume ratio of the two phases is in the range 60:40 to 40:60. Initially the rosin:water phase volume ratio is very high being greater than (500/1.1):100, ignoring any evaporated water. Thus, as the Raifix solution is added the rosin phase is initially in large excess and will form a water-in-rosin emulsion. After the Raifix solution has been added, the rosin:water ratio will approximate to (500/1.1):156, or 75:25 which makes a water-in-rosin emulsion still probable, and means that the inversion will occur during the dilution with "warm" water back to a final emulsion concentration of 45% or less.

Example 12

The rosin emulsion produced in Example 11 was used to prepare two "one-shot" products.

A polyaluminium chloride (12–13% $Al_2O_3$) was mixed with an equal volume of the above emulsion diluted to 30%. There was no sedimentation during a storage time of 4 weeks.

Papermakers' Alum (8.5% $Al_2O_3$) was mixed with an equal volume of the above emulsion diluted to 30%. There was no sedimentation during a storage time of 4 weeks.

Example 13

A rosin emulsion was prepared from the following components

| Raw Material | Amount (kg) |
|---|---|
| Treated rosin | 400 |
| Caustic soda solution (47%) | 7 |
| Raifix 07535 (30%) | 115 |
| Papermakers' alum | 850 |
| Water approx. | 185 |
| To total weight | 1555 |

The emulsion was prepared in a Bewoid pot.

Superheated steam was initially supplied to the emulsion pot jacket and the agitator started.

The rosin was supplied to the pot and after 400 kg had been added the steam supply to the jacket was turned off.

The caustic soda solution was then added slowly, care being taken to minimise foaming. Water was added to cool the batch and the addition continued until steam was no longer generated. Immediately, the Raifix solution (preheated to 90° C.) was added with mixing. After 7 mins. of mixing, dilution water was added, gradually increasing the water addition rate as the emulsion thinned. The amount of dilution water added was such as to produce an emulsion containing about 26% by weight of rosin and having a total solids content of about 54% by weight.

The papermakers alum was added to a total batch weight of 1200 kg and the mixture agitated at maximum speed for 10 mins. Subsequently the remainder of the alum was added.

The "one-shot" emulsion prepared as described above was used for a trial on a small MG paper machine producing approx. 1 tonne $hr^{-1}$ and making both brown and white paper grades. The "one-shot" was added to the thick stock headbox.

The results for the brown packaging grade are shown in Table 1, together with these for operation with the standard anionic casein stabilized Bewoid size immediately before the changeover to previously used the "one-shot" composition.

Table 2 gives similar results for a white grade using a mixed softwood/hardwood virgin furnish. The "one-shot" and the standard emulsion results are comparable since they contain almost the same amount of rosin.

TABLE 1

| Furnish, brown - de-inked KLS waste | | Basis weight = 52 g $m^{-2}$ | |
|---|---|---|---|
| Production | Kg/hr | 1007 | 1007 |
| Thickstock | Ph | 6.90 | 6.85 |
| | Temperature/° C. | 48 | 49 |
| Flowbox | PH | 6.4 | 6.58 |
| | Temperature/° C. | 44 | 44 |
| Backwater | PH | 6.4 | 5.60 |
| | Temperature/° C. | 44 | 44 |
| Previous size addn. | % dfs | 0.63 | — |
| "One-shot" addn | % dfs | — | 0.90 |
| Cobb g m–2 (1 min) | Ex m/c $^1$MG/$^2$WS | 26/29 | 24/29 |
| | Oven cure MG/WS | — | 22/25 |

TABLE 2

| Furnish, white softwood/hardwood virgin | | Basis weight = 52 g $m^{-2}$ | |
|---|---|---|---|
| Production | Kg/hr | 970 | 970 |
| Thickstock | PH | 5.00 | 4.72 |
| | Temperature/° C. | 50 | 50 |
| Flowbox | PH | 5.07 | 5.39 |
| | Temperature/° C. | 44 | 44 |
| Backwater | PH | 5.60 | 5.53 |
| | Temperature/° C. | 44 | 44 |
| Previous size addn. | % dfs | 0.54 | — |
| "One-shot" addn | % dfs | — | 0.67 |
| Cobb g m–2 (1 min) | Ex m/c MG/WS | 23/24 | 23/30 |
| | Oven cure MG/WS | 18/21 | 18/20 |

$^1$MG = Machine Glazed Side
$^2$WS = Wire Side

What is claimed is:

1. A cationic rosin-in-water emulsion which has been prepared without intermediate isolation of an anionic rosin-in-water emulsion and in which the dispersed rosin phase is stabilised by a cationic polymer derived from a degraded starch, said polymer having a degree of substitution of at least 0.15 quaternary ammonium groups per glucose unit.

2. An emulsion as claimed in claim 1 wherein said polymer has a degree of substitution of from 0.15 to 1.30 quaternary ammonium groups per glucose unit.

3. An emulsion as claimed in claim 2 wherein said polymer has a degree of substitution of from 0.20 to 1.10 quaternary ammonium groups per glucose unit.

4. An emulsion as claimed in claim 3 wherein said polymer has a degree of substitution of from 0.20 to 0.80 quaternary ammonium groups per glucose unit.

5. An emulsion as claimed in claim 4 wherein said polymer has a degree of substitution of from 0.50 to 0.80 quaternary ammonium groups per glucose unit.

6. An emulsion as claimed in claim 1 wherein the cationic polymer has been quaternised with 2,3-epoxypropylene trimethyl ammonium chloride.

7. An emulsion as claimed in claim 6 wherein the cationic polymer has a nitrogen content of 1 to 5% by weight.

8. An emulsion as claimed in claim 7 wherein the cationic polymer has a nitrogen content of 3 to 4% by weight.

9. An emulsion as claimed in claim 1 wherein the rosin is a wood rosin, gum rosin, tall oil rosin or mixture thereof.

10. A rosin emulsion as claimed in claim 1 wherein the rosin is fortified, unfortified, hydrogenated, disproportionated and/or esterified.

11. A rosin emulsion as claimed in claim 1 wherein the rosin is a maleated or fumarated rosin.

12. A rosin emulsion as claimed in claim 1 wherein the rosin is compounded with tall oil fatty acids.

13. A rosin emulsion as claimed in claim 1 having a solids content of 60% by weight or less.

14. A rosin emulsion as claimed in claim 13 having a solids content of 50% by weight or less.

15. A rosin emulsion as claimed in claim 14 having a solids content of 40% by weight or less.

16. A rosin emulsion as claimed in claim 15 having a solids content of 30% by weight or less.

17. A rosin emulsion as claimed in claim 1 wherein the rosin (together with any tall oil fatty acids or other rosin diluent present) comprises 75% to 95% by weight of the total solids of the rosin emulsion and the cationic starch derivative correspondingly comprises 5% to 25% of the total solids.

18. A rosin emulsion as claimed in claim 17 wherein the rosin (including any tall oil fatty acids or other rosin diluent) provides about 87 to 93% by weight of the total solids.

19. A method of producing a cationic rosin-in-water emulsion comprising effecting emulsification of rosin in water in the presence of a cationic polymer derived from a degraded starch, said polymer having a degree of substitution of at least 0.15 quaternary ammonium groups per glucose unit.

20. A method of producing a rosin emulsion wherein said method comprises inversion of a water-in-rosin emulsion to a rosin-in-water emulsion in the presence of a cationic polymer derived from a degraded starch, said polymer having a degree of substitution of at least 0.15 quaternary ammonium groups per glucose unit.

21. A method as claimed in claim 20 wherein the rosin is partially saponified to produce a rosin soap which acts as a dispersant.

22. A method as claimed in claim 21 wherein the rosin is treated with a dispersant.

23. A method as claimed in claim 22 wherein the dispersant is naphthalene sulphonic acid-formaldehyde condensate or sodium ligno-sulphonate.

24. A method as claimed in claim 20 wherein the cationic polymer is heated prior to addition to the molten rosin.

25. A method as claimed in claim 24 wherein the cationic polymer is heated to a temperature of at least 85° C. prior to addition to the molten rosin.

26. A method as claimed in claim 20 wherein heated water is added to the molten rosin prior to emulsion inversion occurring.

27. A method as claimed in claim 26 wherein the heated water is at a temperature of at least 90° C.

28. A method of producing a rosin-in-water emulsion comprising (i) preparing molten rosin;

(ii) either saponifying the molten rosin or treating the molten rosin with a dispersant;

(iii) preparing a water-in-rosin emulsion by adding water and a stabiliser for the ultimate rosin-in-water emulsion to the molten rosin resulting from step (ii); and (iv) effecting inversion of the water-in-rosin emulsion to form the rosin-in-water emulsion characterised in that the stabiliser is a cationic polymer derived from a degraded starch, said polymer having a degree of substitution of the least 0.15 quaternary ammonium groups per glucose units, and in that said cationic polymer is the sole stabiliser.

29. A method of producing a cationic rosin-in-water emulsion without prior formation of an anionic rosin-in-water emulsion comprising effecting homogenization of either molten or dissolved rosin with a cationic polymer derived from a degraded starch, said polymer having a degree of substitution of at least 0.15 quaternary ammonium groups per glucose unit.

* * * * *

UNITED STATES PATENT AND TRADEMARK OFFICE
CERTIFICATE OF CORRECTION

PATENT NO.    : 6,369,119 B1                                           Page 1 of 1
DATED         : April 9, 2002
INVENTOR(S)   : Roberts et al.

It is certified that error appears in the above-identified patent and that said Letters Patent is hereby corrected as shown below:

<u>Title page,</u>
Item [73], Assignee, please correct the name to -- Raisio Chemicals UK Ltd. --

Item [30], Foreign Application Priority Data, please insert the following:

-- [30]  Foreign Application Priority Data
October 8, 1997 (GB) ............... 9721188.2 --

Signed and Sealed this

Twenty-sixth Day of November, 2002

*Attest:*

JAMES E. ROGAN
*Attesting Officer*  *Director of the United States Patent and Trademark Office*